US008935284B1

United States Patent
Cooley

(10) Patent No.: US 8,935,284 B1
(45) Date of Patent: Jan. 13, 2015

(54) SYSTEMS AND METHODS FOR ASSOCIATING WEBSITE BROWSING BEHAVIOR WITH A SPAM MAILING LIST

(75) Inventor: Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 587 days.

(21) Appl. No.: 12/836,703

(22) Filed: Jul. 15, 2010

(51) Int. Cl.
*G06F 17/30* (2006.01)

(52) U.S. Cl.
USPC .......................................... 707/776; 709/206

(58) Field of Classification Search
CPC ..................... G06F 17/30539; G06F 2216/03
USPC ...................... 707/802, 776; 709/206; 706/45
See application file for complete search history.

(56) References Cited

U.S. PATENT DOCUMENTS

| | | | |
|---|---|---|---|
| 2003/0204569 A1* | 10/2003 | Andrews et al. ............. | 709/206 |
| 2005/0165892 A1* | 7/2005 | Kelly ........................... | 709/205 |
| 2005/0204012 A1* | 9/2005 | Campbell ..................... | 709/206 |
| 2005/0228899 A1* | 10/2005 | Wendkos et al. ............ | 709/232 |
| 2007/0038600 A1* | 2/2007 | Guha ............................ | 707/707 |
| 2007/0113101 A1* | 5/2007 | LeVasseur et al. ........... | 713/189 |
| 2008/0307057 A1* | 12/2008 | Prentiss, Jr. .................. | 709/206 |
| 2009/0006285 A1* | 1/2009 | Meek et al. ..................... | 706/12 |
| 2009/0044013 A1* | 2/2009 | Zhu et al. ...................... | 713/170 |
| 2009/0216905 A1* | 8/2009 | Adelman et al. ............. | 709/245 |
| 2010/0088041 A1* | 4/2010 | Ringermacher et al. ........ | 702/40 |
| 2010/0174784 A1* | 7/2010 | Levey et al. .................. | 709/206 |
| 2010/0174795 A1* | 7/2010 | Adelman et al. ............. | 709/206 |
| 2010/0205259 A1* | 8/2010 | Vitaldevara et al. .......... | 709/206 |
| 2010/0263045 A1* | 10/2010 | Dulitz et al. .................... | 726/22 |
| 2010/0281535 A1* | 11/2010 | Perry et al. ..................... | 726/22 |
| 2011/0035451 A1* | 2/2011 | Smith et al. .................. | 709/206 |
| 2011/0219073 A1* | 9/2011 | Lawler et al. ................. | 709/204 |
| 2014/0137229 A1* | 5/2014 | Dawson et al. ................. | 726/11 |

* cited by examiner

*Primary Examiner* — Robert Beausoliel, Jr.
*Assistant Examiner* — Alexandria Bromell
(74) *Attorney, Agent, or Firm* — Holland & Hart LLP

(57) ABSTRACT

A computer-implemented method for associating website browsing behavior with a spam mailing list is described. A history of website browsing behavior is collected for a plurality of users. At least one spam mailing list is identified that includes an e-mail address for at least two users of the plurality of users. A determination is made as to whether a common website exists between the histories of website browsing behavior for the at least two users. Reputation information for the common website is updated.

20 Claims, 11 Drawing Sheets

— 1 —

SYSTEMS AND METHODS FOR ASSOCIATING WEBSITE BROWSING BEHAVIOR WITH A SPAM MAILING LIST

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies is important to anyone that uses and relies on computers.

Users of computing systems may communicate with each other via several communications means. For example, users may create and send electronic mail (e-mail) to one another. Companies or other business entities may also communicate with customers via e-mail. For example, customers may receive coupons or other information regarding a particular product a company is selling via an e-mail message. Unfortunately, many users receive unsolicited e-mail messages from other users, companies, etc. These unsolicited e-mails are commonly referred to as spam. A user may receive a high volume of spam e-mail messages each day. This may require the user to spend time looking at each e-mail the user has received to determine if an e-mail is spam. Identifying the originator of a spam e-mail may benefit the user. The user may avoid providing personal information (such as an e-mail address) to a known originator of spam. As a result, benefits may be realized by providing system and methods for associating website browsing behavior with a spam mailing list in order to identify the originator of a spam e-mail.

SUMMARY

According to at least one embodiment, a computer-implemented method for associating website browsing behavior with a spam mailing list is described. A history of website browsing behavior is collected for a plurality of users. At least one spam mailing list is identified that includes an e-mail address for at least two users of the plurality of users. A determination is made as to whether a common website exists between the histories of website browsing behavior for the at least two users. Reputation information for the common website is updated.

In one embodiment, a website browsing application is monitored. Information relating to websites accessed by the website browsing application may be collected. Accessed websites that include a data form may be identified.

In one example, at least one client computing device that receives e-mail messages may be identified. Information identifying at least one e-mail message received by the at least one client may be received. In addition, the identifying information may be recorded in a database. In one configuration, the at least one spam mailing list may be identified by identifying at least one group of client computing device with similar patterns of identifying information.

In one embodiment, the history of website browsing behavior may be transmitted to a back end computing device for processing in real time. In another embodiment, a browser history for a user may be copied and the copy of the browser history may be transmitted to a back end computing device for processing.

A computing device configured to associate website browsing behavior with a spam mailing list is also described. The computing device may include a processor and memory in electronic communication with the processor. The computing device may further include a website identification module configured to collect a history of website browsing behavior for a plurality of users, and identify at least one spam mailing list that includes an e-mail address for at least two users of the plurality of users. The website identification module may be further configured to determine if a common website exists between the histories of website browsing behavior for the at least two users, and update reputation information for the common website.

A computer-program product for associating website browsing behavior with a spam mailing list is also described. The computer-program product may include a computer-readable medium having instructions thereon. The instructions may include code programmed to collect a history of website browsing behavior for a plurality of users, and code programmed to identify at least one spam mailing list that includes an e-mail address for at least two users of the plurality of users. The instructions may further include code programmed to determine if a common website exists between the histories of website browsing behavior for the at least two users, and code programmed to update reputation information for the common website.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
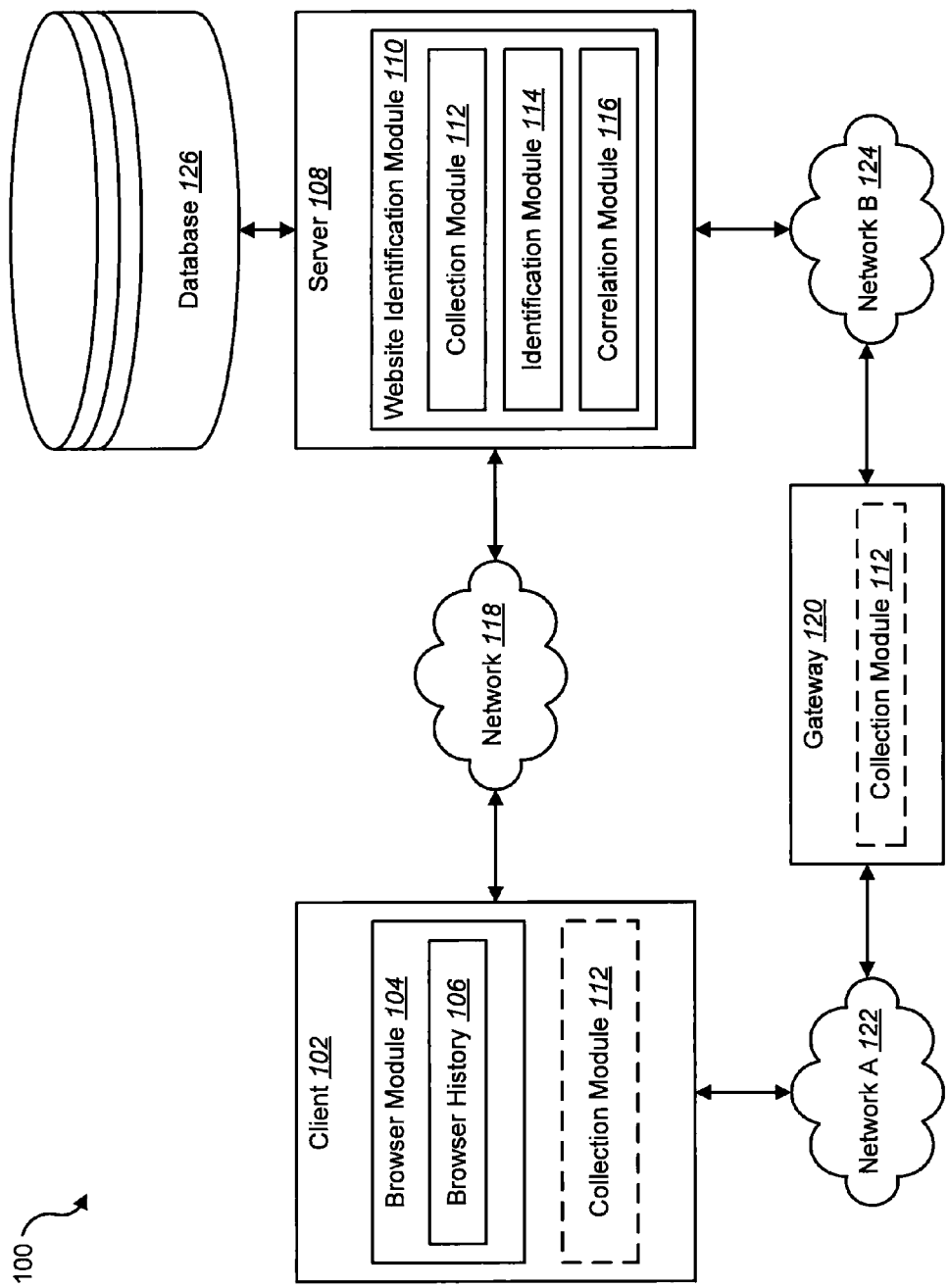
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Many users of computers have e-mail addresses. Users may send/receive e-mails to/from other e-mail addresses. Since the emergence of e-mail, users have received an increasingly amount of unsolicited e-mails from various parties. These e-mail messages may be referred to as spam. Originators of spam e-mail (i.e., spammers) may collect e-mail addresses from chatrooms, websites, customer lists, newsgroups, and viruses which harvest users' address books. The collected e-mail addresses may be placed on a spam mailing list. The spammers may then send out nearly identical spam e-mail messages to the e-mail addresses included on the spam mailing list. In addition, a spammer may sell a spam mailing list (which includes collected e-mail addresses) to other spammers.

The present systems and methods provide a mechanism to identify specific websites that abuse (e.g., send spam) or sell customer e-mail addresses by correlating a user's browsing history of websites with a spam mailing list. Current systems used to identify which websites abuse or sell customer information to spammers are based on the concept of honeypots. A honeypot may be a trap set to detect, deflect, or in some manner counteract attempts at unauthorized use of information.

In some instances, system administrators have created a spam honeypot. In these instances, the honeypot is an e-mail address that is set up for the sole purpose of receiving spam. Current systems analyze websites on the Internet to identify web forms in which a user may enter an e-mail address. A unique honeypot e-mail address may then be generated for each website found that includes a web form. The generated honeypot e-mail address may be submitted to the identified web form. A problem with the current approach is that it requires large server farms to do the analyzing and additional server resources to accept e-mail messages sent to the various honeypot e-mail addresses. As the number of websites continues to grow, the current solution to identify spam becomes increasingly impractical.

The present systems and methods may leverage the enormous base of endpoints or clients that are accessing the Internet to correlate the browsing history of websites to spam received in order to identify the original abuser of a user's e-mail address. The abuse may then be further correlated in order to determine annoyance score (or reputation) for an individual website.

FIG. 1 is a block diagram 100 illustrating one embodiment of an environment in which the present systems and methods may be implemented. In one example, a client 102 may communicate with a server 108 across a network connection 118. The client 102 may be a computing device such as a personal computer (PC), a laptop, a personal digital assistance (PDA), a smart phone, or any other type of computing device. In one example, the client 102 may include a browser module 104. The browser module 104 may be an application or program that accesses and displays websites from the Internet to a user. Examples of the browser module 104 may include Internet Explorer, Firefox, Google Chrome, Safari, etc. The browser module 104 may include a browser history 106. The browser history 106 may be a collection or list of websites previously visited or accessed by the web browser 104.

In one embodiment, the server 108 may include a website identification module 110. In one configuration, the website identification module 110 may include a collection module 112, an identification module 114, and a correlation module 118. The collection module 112 may be located on the server 108, on the client 102, or on a gateway device 120 that may interface between two different networks, such as Network A 122 and Network B 124. The collection module 112 may be an application or program that collects a user's browser history 106. In other words, the collection module 112 may collect an identifier for each website (such as a Uniform Resource Locator (URL)) accessed by the browser module 104. The collected identifiers may then populate the browser history 106.

In one example, the identification module 114 may be an application or program that identifies spam mailing lists. The correlation module 116 may be an application or program that correlates the browser history 106 of at least one user to at least one spam mailing list.

Information and data collected by the website identification module 110 may be stored in, and later accessed from, a database 126. Details regarding the individual modules 112, 114, 116 of the website identification module 110 will be described in detail below.

Figure 2:
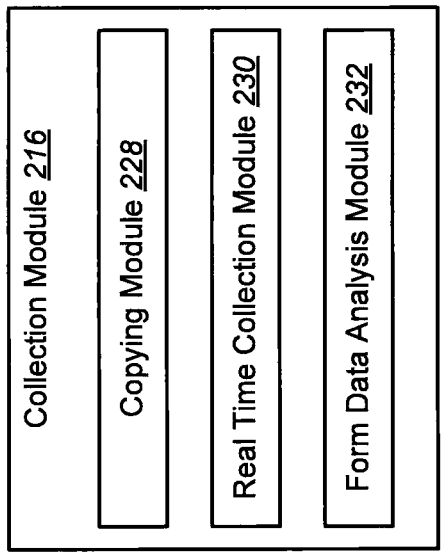
FIG. 2 is a block diagram illustrating one embodiment of a collection module.

FIG. 2 is a block diagram illustrating one embodiment of a collection module 216. In one embodiment, the collection module 216 may be stored locally on the client 102 and may be implemented through a browser plug-in or a locally hosted network proxy. In one example, the collection module 216 may include a copying module 228, a real time collection module 230, and a form data analysis module 232.

The copying module 228 may be a mechanism for obtaining or tracking a user's browsing history. For example, the copying module 228 may be a component on the client 102 that copies the user's web browser history 106 to a back end, such as the server 108, for processing.

The real time collection module 230 may be a component located on the client 102, on the gateway 120, or on the server 108, that provides the user's browsing activity to a back end (such as the server 108) in real time. For example, if the collection module 216 is located on the client 102 or on the gateway 120, the real time collection module 230 may transmit the user's browsing activity to the server 108 in real time. In other words, the URL of a website may be transmitted to the server 108 in real time when the URL is accessed by the browser module 104.

The form data analysis module 232 may analyze a website accessed by the browser module 104 to determine if the user submitted any data to the form (e.g., e-mail address). The collection module 216 may collect the URLs for websites in which the user provided data, such as an e-mail address. The URLs may be reported to the server 108 for further analysis.

Figure 3:
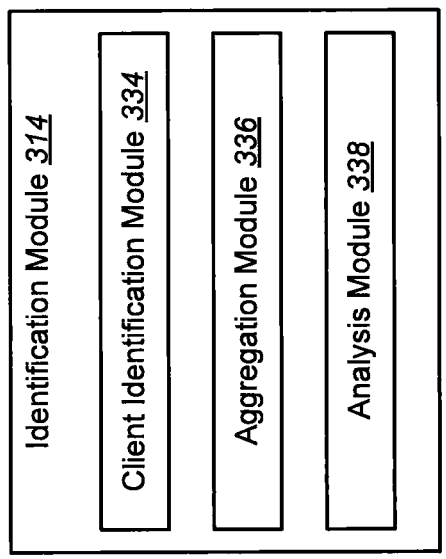
FIG. 3 is a block diagram illustrating one embodiment of an identification module.

FIG. 3 is a block diagram illustrating one embodiment of an identification module 314. The identification module 314 may identify at least one client 102 that receives e-mail messages. The identification module 314 may include a client identification module 334, an aggregation module 336, and an analysis module 338.

In one embodiment, the client identification module 334 may identify the at least one client 102. The identification module 314 may receive from the at least one client 102, information identifying at least one e-mail message received by the client 102. For example, the aggregation module 336 may receive from the at least one client 102, information identifying at least one received e-mail message (e.g., information identifying at least one e-mail message received by the client 102, information identifying at least one e-mail message received by another client, etc.). The aggregation module 336 may record identifying information received from each client in a database 126.

In one embodiment the analysis module 338 may identify at least one mailing list (such as a spam mailing list) that includes e-mail addresses for at least one user. The mailing list may be identified by identifying at least one group of users within a plurality of users with similar patterns of identifying information (e.g., by comparing identifying information received from the clients and recorded in the database 126).

Figure 4:
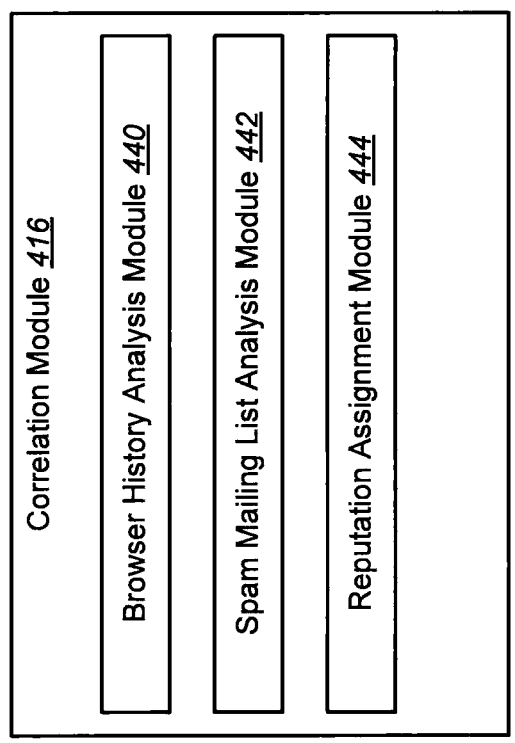
FIG. 4 is a block diagram illustrating one embodiment of a correlation module.

FIG. 4 is a block diagram illustrating one embodiment of a correlation module 416. The correlation module 416 may correlate the browsing history of a particular user to a spam mailing list in order to determine the source of a spam e-mail. For example, a browser history analysis module 440 may analyze various websites included in the browser histories collected from one or more clients. The browser history analysis module 440 may determine the websites that were commonly visited by each of the clients. A spam mailing list analysis module 442 may analyze the various e-mail addresses that may be included in the spam mailing list. The correlation module 416 may determine, based upon the analysis performed by the modules 440, 442, the website or websites responsible for originating a spam e-mail message. A reputation assignment module 444 may assign a reputation (or annoyance score) to the website that is determined to be the originator of a spam e-mail message.

Figure 5:
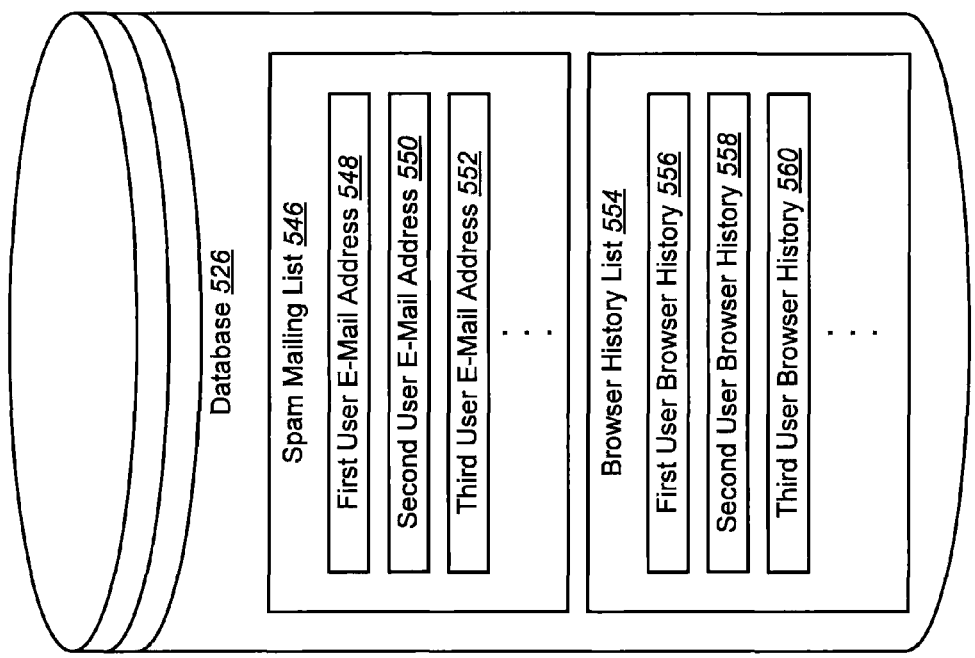
FIG. 5 is a block diagram illustrating one embodiment of a database that may be used in accordance with the present systems and methods.

FIG. 5 is a block diagram illustrating one embodiment of a database 526 that may be used in accordance with the present systems and methods. In one embodiment, the database 526 may include a spam mailing list 546 and a browser history list 554.

The spam mailing list 546 may include a list of e-mail addresses for various users. For example, the mailing list 546 may include a first user email address 548, a second user email address 550, a third user email address 552, etc. The browser history list 554 may include browser histories for various users. Each browser history may include a list of URLs previously accessed by a user via a browser module. For example, the browser history list 554 may include a first user browser history 556, a second user browser history 558, a third user browser history 560, etc.

In one embodiment, the information may be provided to the database 526 by the website identification module 110. In addition, the information stored in the database 526 may be accessed and analyzed by the website identification module 110.

Figure 6:
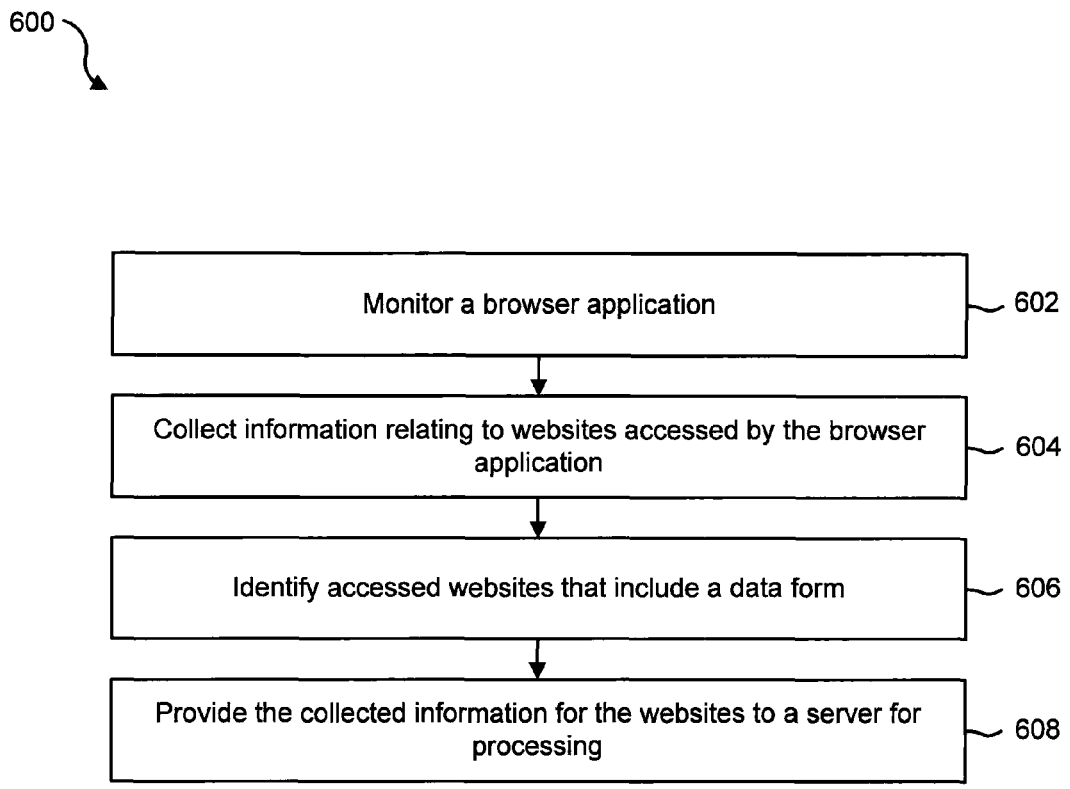
FIG. 6 is a flow diagram illustrating one embodiment of a method for collecting a browser history for a particular user.

FIG. 6 is a flow diagram illustrating one embodiment of a method 600 for collecting a browser history for a particular user. In one embodiment the method 600 may be implemented by the collection module 112.

In one example, a browser application may be monitored 602. The browser application may be executing on a client computing device 102. The application may be monitored to identify the URLs of websites accessed by the browser application. Information, such as the URLs, relating to websites accessed by the browser application may be collected 604. In addition, websites that include a data form may be identified 606. The data form may request a user to provide information, such as an e-mail address. The collected information (e.g., URLs) for the websites may be provided 608 to a server for further processing.

Figure 7:
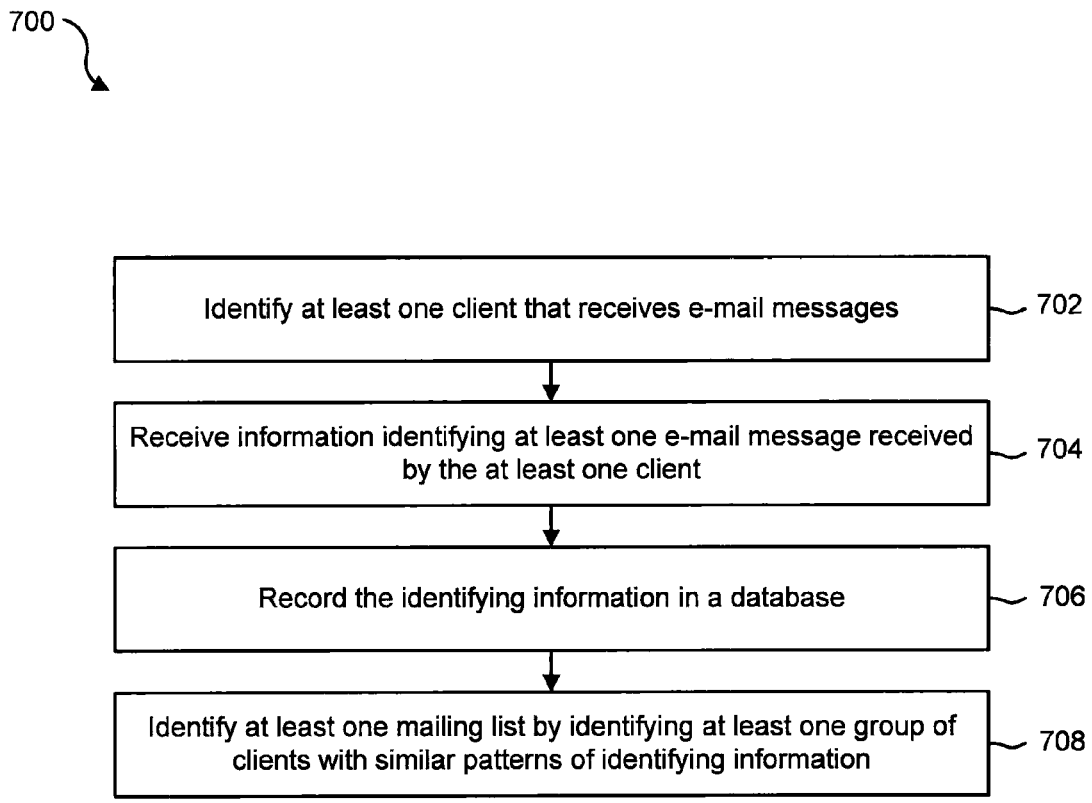
FIG. 7 is a flow diagram illustrating one embodiment of a method for identifying spam mailing lists.

FIG. 7 is a flow diagram illustrating one embodiment of a method 700 for identifying spam mailing lists. The method 700 may be implemented by the identification module 114.

In one embodiment at least one client computing device that receives e-mail messages may be identified 702. Information identifying at least one e-mail message received by the at least one client may be received 704. The identifying information may be recorded 706 in a database. At least one spam mailing list may be identified 708 by identifying at least one group of client computing device with similar patterns of identifying information.

Figure 8:
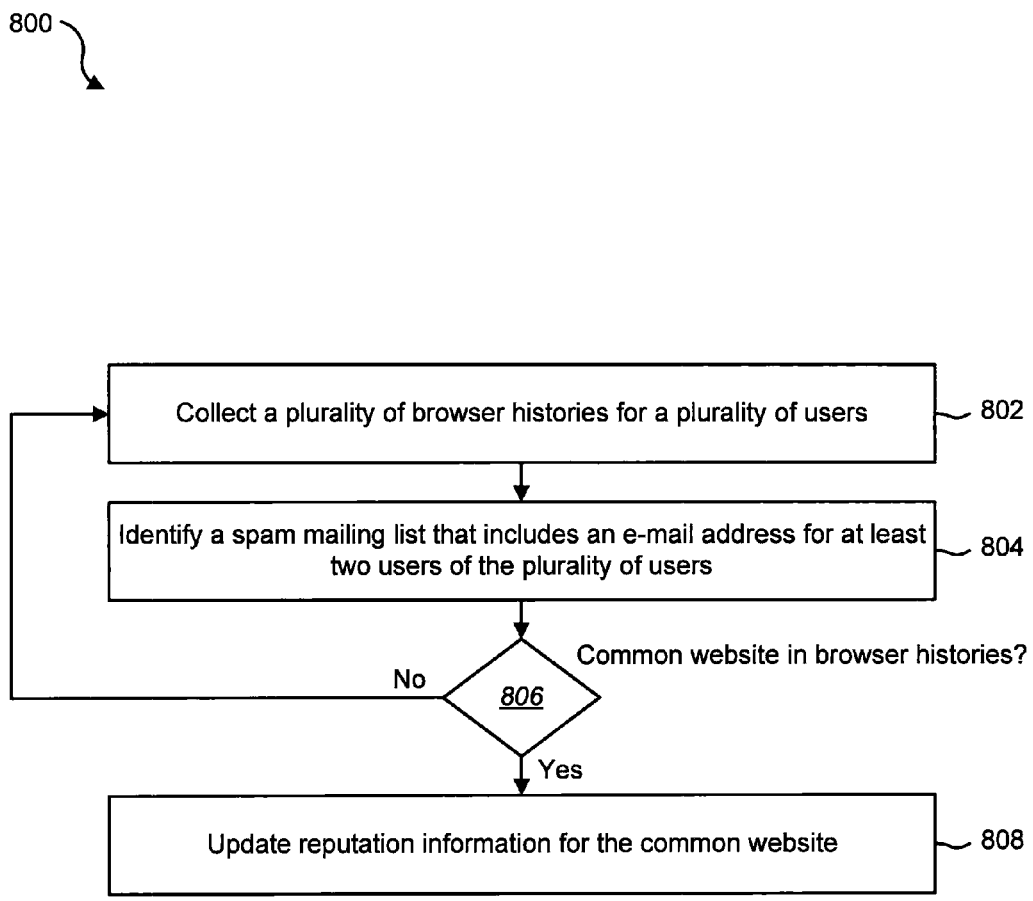
FIG. 8 is a flow diagram illustrating one embodiment of a method for associating website browsing behavior with a specific spam mailing lists.

FIG. 8 is a flow diagram illustrating one embodiment of a method 800 for associating website browsing behavior with a specific spam mailing lists. In particular, the method 800 may identify a website that originates a spam e-mail by correlating a browser history for a plurality of users with a spam mailing list. In one embodiment, the method 800 may be implemented by the website identification module 110. In particular, the method 800 may be implemented by the correlation module 116.

In one example, a plurality of browser histories for a plurality of users may be collected 802. The various browser histories may include URLs of websites accessed by each of the users via a browser application. A spam mailing list that includes an e-mail address for at least two of the plurality of users may be identified 804. In one embodiment, the spam mailing list may include an e-mail address for additional users. A determination 806 may be made as to whether multiple browser histories include a common website. If it is determined 806 that a common website exists across multiple browser histories does not exist, the method 800 may return to continue to collect browser histories. If, however, it is determined 806 that a common website exists across multiple browser histories, reputation information for the common website may be updated 808. In addition, a message may be transmitted or displayed to a user attempting to access the common website. The message may inform the user that the website (or owner of the website) may be responsible for originating spam e-mail.

In other words, the method 800 may select an intersecting set of browsing histories among users that are included in a spam mailing list. Websites included in the intersecting set that were visited by a certain number of users included on the spam mailing list may receive a negative reputation score. An example of the method 800 is further illustrated below in relation to FIG. 9.

Figure 9:
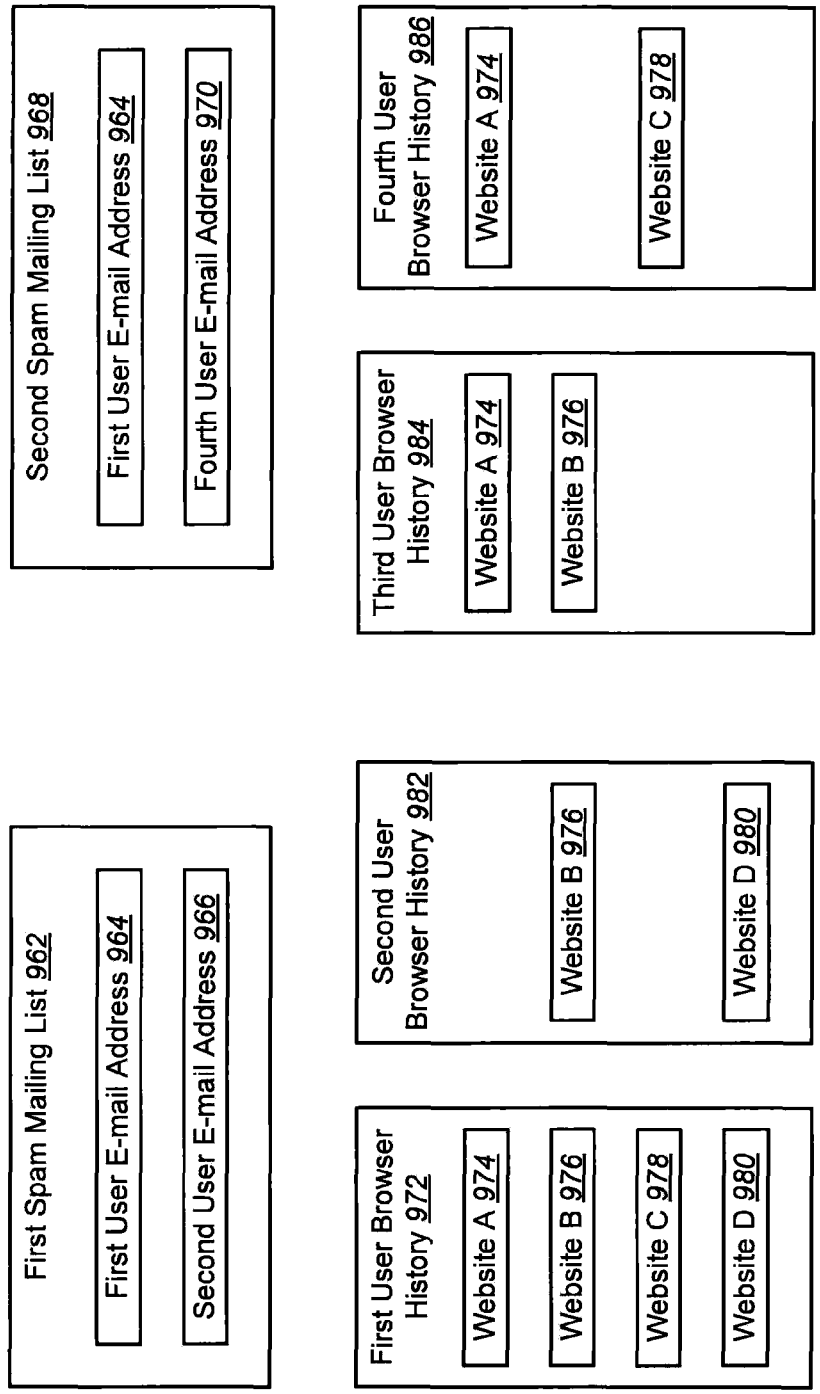
FIG. 9 is a block diagram illustrating one example of multiple spam mailing lists and multiple browsing histories.

FIG. 9 is a block diagram illustrating one example of a first spam mailing list 962 and a second spam mailing list 968. FIG. 9 further includes an example of various browser histories 972, 982, 984, 986 for multiple users.

An e-mail address of a first user 964 may be included on the first spam mailing list 962 and the second spam mailing list 968. The browser history for the first user 972 may include URLs for website A 974, website B 976, website C 978, and website D 980. An e-mail address for a second user 966 may also be included on the first spam mailing list 962. The browser history for the second user 982 may include URLs for website B 976 and website D 980. In one embodiment, an e-mail address for a third user may not be included on a spam mailing list. The browser history for the third user 984 may include URLs for website A 974 and website B 976. Finally, an e-mail address for a fourth user 970 may be included on the second spam mailing list 968. The browser history for the fourth user 986 may include URLs for website A 974 and website C 978. In one embodiment, the method 800 may determine that the website that originates a spam e-mail that is sent to e-mail addresses included on the first spam mailing list 962 may be website D 980. A possible representation of this determination may be as follows:

$$(\text{First User} \cap \text{Second User}) \backslash (\text{Third User} \cup \text{Fourth User}) \qquad \text{Equation 1}$$

Alternatively, the representation of this determination may be represented by the websites visited by each user, as follows:

$$(\{A,B,C,D\} \cap \{B,D\}) \backslash (\{A,B\} \cup \{A,C\}) \qquad \text{Equation 2}$$

The method 800 may also determine that the origin website of a spam e-mail that is sent to e-mail addresses included on the second spam mailing list 968 may be website C 978. A possible representation of this determination may be follows:

$$(\text{First User} \cap \text{Fourth User}) \backslash (\text{Second User} \cup \text{Third User}) \qquad \text{Equation 3}$$

Alternatively, the representation of this determination may be represented by the websites visited by each user, as follows:

$$(\{A,B,C,D\} \cap \{A,C\}) \backslash (\{B,D\} \cup \{A,B\}) \qquad \text{Equation 4}$$

In one configuration, the complement of the intersection of the browsing histories for various users on a spam mailing list relative to the union of the browsing histories for users not on the spam mailing list may provide a set of potential websites that originated a spam e-mail. If a single website is included in the set of potential websites, the single website may be convicted and the conviction may count against the reputation for that website. When the potential website set results in more than one website, the negative reputation association may be split evenly among the potential websites until additional information provides a single result.

In one example, the weighting of the negative reputation may be determined based on a number of users that produced the initial intersection, with the present system and methods having a threshold of reporting users before a conviction contributes to the reputation of a website. For example, a conviction from 100 users may not affect a website's reputation as dramatically as a conviction from 10,000 users.

Figure 10:
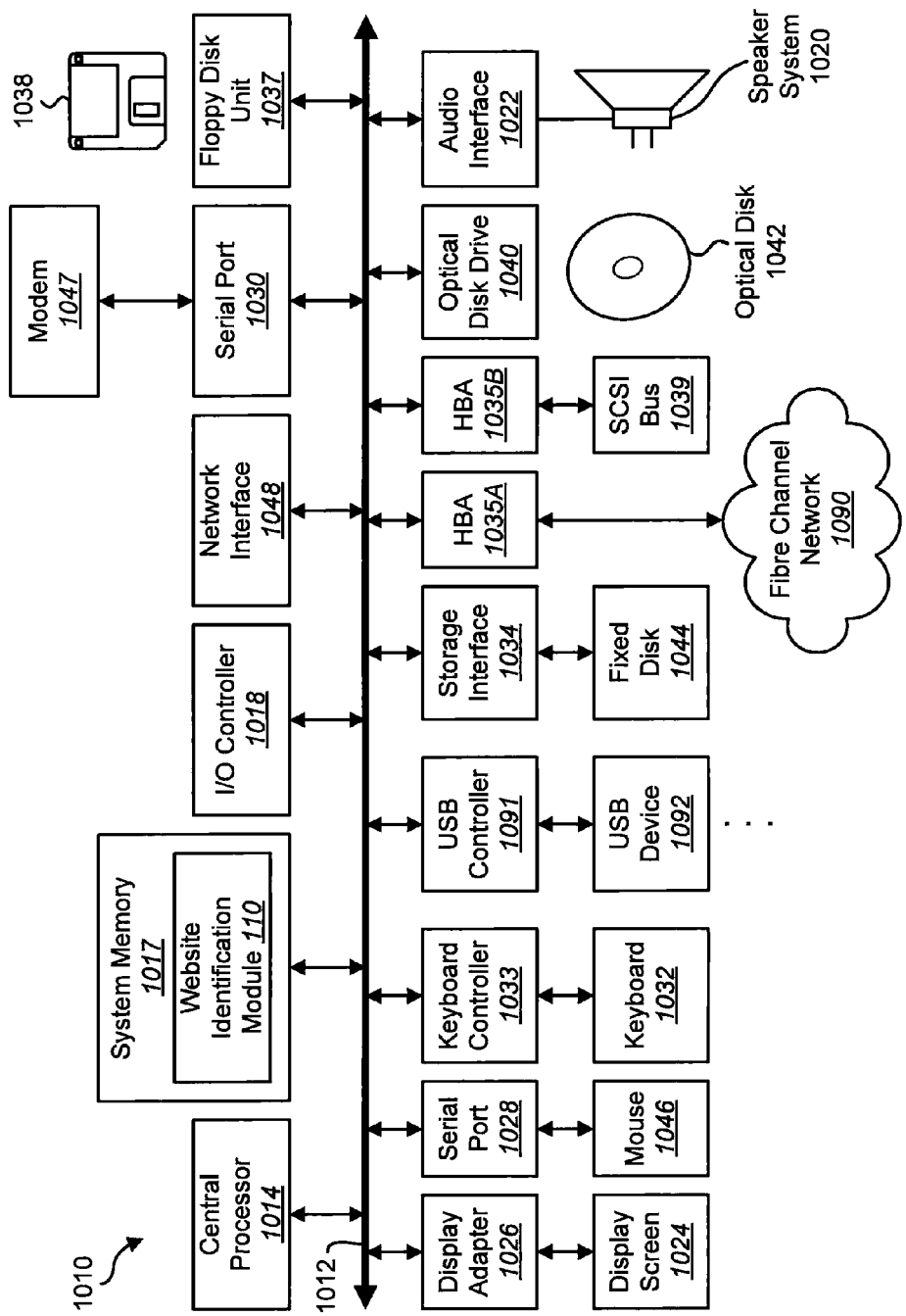
FIG. 10 depicts a block diagram of a computer system suitable for implementing the present systems and methods.

FIG. 10 depicts a block diagram of a computer system 1010 suitable for implementing the present systems and methods. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), multiple USB devices 1092 (interfaced with a USB controller 1090), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the website identification module 110 to implement the present systems and methods may be stored within the system memory 1017. Applications resident with computer system 1010 are generally stored on and accessed via a computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard computer readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present systems and methods. The devices and subsystems can be interconnected in different ways from that shown in FIG. 10. The operation of a computer system such as that shown in FIG. 10 is readily known in the art and is not discussed in detail in this application. Code to implement the present disclosure can be stored in computer-readable medium such as one or more of system memory 1017, fixed disk 1044, optical disk 1042, or floppy disk 1038. The operating system provided on computer system 1010 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 11:
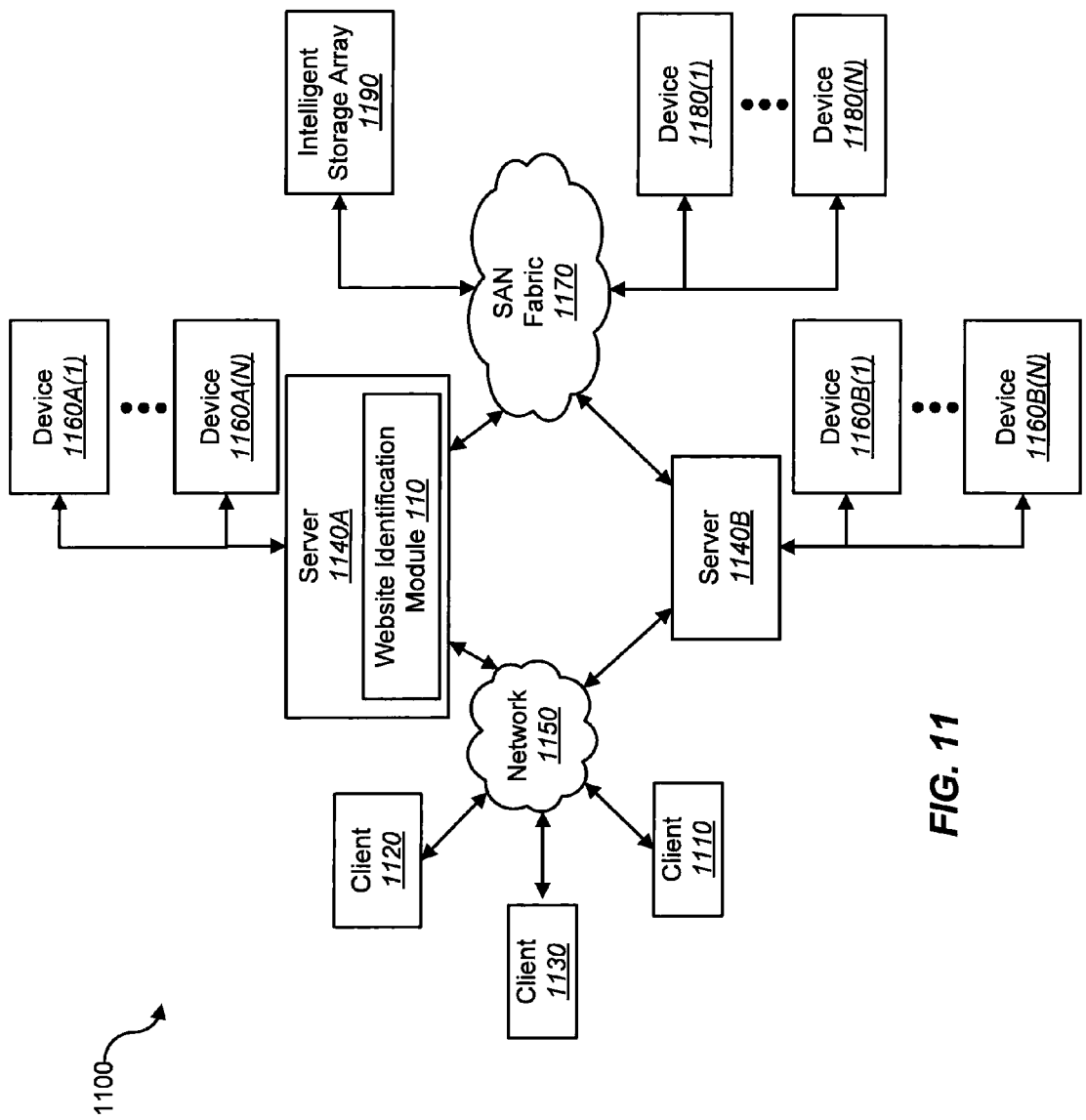
FIG. 11 is a block diagram depicting a network architecture in which client systems, as well as storage servers (any of which can be implemented using computer system), are coupled to a network.

FIG. 11 is a block diagram depicting a network architecture 1100 in which client systems 1110, 1120 and 1130, as well as storage servers 1140A and 1140B (any of which can be implemented using computer system 1110), are coupled to a network 1150. In one embodiment, the website identification module 110 may be located within a server 1140A, 1140B to implement the present systems and methods. The storage server 1140A is further depicted as having storage devices 1160A(1)-(N) directly attached, and storage server 1140B is depicted with storage devices 1160B(1)-(N) directly attached. SAN fabric 1170 supports access to storage devices 1180(1)-(N) by storage servers 1140A and 1140B, and so by client systems 1110, 1120 and 1130 via network 1150. Intelligent storage array 1190 is also shown as an example of a specific storage device accessible via SAN fabric 1170.

With reference to computer system 1010, modem 1047, network interface 1048 or some other method can be used to provide connectivity from each of client computer systems 1110, 1120, and 1130 to network 1150. Client systems 1110, 1120, and 1130 are able to access information on storage server 1140A or 1140B using, for example, a web browser or other client software (not shown). Such a client allows client systems 1110, 1120, and 1130 to access data hosted by storage server 1140A or 1140B or one of storage devices 1160A(1)-(N), 1160B(1)-(N), 1180(1)-(N) or intelligent storage array 1190. FIG. 11 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for associating website browsing behavior with a spam mailing list, comprising:
    collecting a history of website browsing behavior for each of a plurality of users;
    identifying at least one spam mailing list that includes an e-mail address for a first user and an email address for a second user of the plurality of users;
    determining if a level of similarity between a first email message received at the e-mail address for the first user and a second email message received at the e-mail address for the second user exceeds a threshold;
    upon determining that the level of similarity exceeds the threshold;
    determining if a common website exists between the history of website browsing behavior for the first user and the history of website browsing behavior for the second user; and
    upon determining that a common website exists, updating reputation information for the common website, wherein the reputation information indicates a likelihood that e-mail messages sent to e-mail addresses on the at least one spam mailing list originate from the common website.

2. The method of claim 1, further comprising monitoring a website browsing application for each of the plurality of users.

3. The method of claim 2, further comprising collecting information relating to websites accessed by the website browsing application.

4. The method of claim 3, further comprising identifying accessed websites that include a data form.

5. The method of claim 1, further comprising identifying at least one client computing device that receives e-mail messages.

6. The method of claim 5, further comprising receiving information identifying at least one e-mail message received by the at least one client.

7. The method of claim 6, further comprising recording the identifying information in a database.

8. The method of claim 7, further comprising identifying the at least one spam mailing list by identifying at least one group of client computing device with similar patterns of identifying information.

9. The method of claim 1, further comprising transmitting the history of website browsing behavior to a back end computing device for processing in real time.

10. The method of claim 1, further comprising copying a browser history for a user and transmitting the copy of the browser history to a back end computing device for processing.

11. A computing device configured to associate website browsing behavior with a spam mailing list, comprising:
 a processor;
 memory in electronic communication with the processor, the memory storing computer executable instructions that when executed by the processor cause the processor to:
  collect a history of website browsing behavior for each of a plurality of users;
  identify at least one spam mailing list that includes an e-mail address for a first user and an email address for a second user of the plurality of users;
  determine if a level of similarity between a first email message received at the e-mail address for the first user and a second email message received at the e-mail address for the second user exceeds a threshold;
  upon determining that the level of similarity exceeds the threshold;
  determine if a common website exists between the history of website browsing behavior for the first user and the history of website browsing behavior for the second user; and
  upon determining that a common website exists, update reputation information for the common website, wherein the reputation information indicates a likelihood that e-mail messages sent to e-mail addresses on the at least one spam mailing list originate from the common website.

12. The computing device of claim 11, wherein the processor is further configured to monitor a website browsing application for each of the plurality of users.

13. The computing device of claim 12, wherein the processor is further configured to collect information relating to websites accessed by the website browsing application.

14. The computing device of claim 13, wherein the processor is further configured to identify accessed websites that include a data form.

15. The computing device of claim 11, wherein the processor is further configured to identify at least one client computing device that receives e-mail messages.

16. The computing device of claim 15, wherein the processor is further configured to receive information identifying at least one e-mail message received by the at least one client.

17. The computing device of claim 16, wherein the processor is further configured to record the identifying information in a database.

18. The computing device of claim 17, wherein the processor is further configured to identify the at least one spam mailing list by identifying at least one group of client computing device with similar patterns of identifying information.

19. The computing device of claim 11, wherein the processor is further configured to transmit the history of website browsing behavior to a back end computing device for processing in real time.

20. A computer-readable storage device storing instructions that when executed cause a processor to:
 collect a history of website browsing behavior for each of a plurality of users;
 identify at least one spam mailing list that includes an e-mail address for a first user and an email address for a second user of the plurality of users;
 determine if a level of similarity between a first email message received at the e-mail address for the first user and a second email message received at the e-mail address for the second user exceeds a threshold;
 upon determining that the level of similarity exceeds the threshold;
 determine if a common website exists between the history of website browsing behavior for the first user and the history of website browsing behavior for the second user; and
 upon determining that a common website exists, update reputation information for the common website, wherein the reputation information indicates a likelihood that e-mail messages sent to e-mail addresses on the at least one spam mailing list originate from the common website.

\* \* \* \* \*